United States Patent [19]

Mollenauer

[11] Patent Number: 5,710,649
[45] Date of Patent: Jan. 20, 1998

[54] APPARATUS AND METHODS FOR NULLING NON-RANDOM TIMING JITTER IN THE TRANSMISSION OF DIGITAL OPTICAL SIGNALS

[75] Inventor: Linn Frederick Mollenauer, Colts Neck, N.J.

[73] Assignee: Lucent Technologies Inc., Murray Hill, N.J.

[21] Appl. No.: 566,815

[22] Filed: Dec. 4, 1995

[51] Int. Cl.$^6$ .............. H04J 4/00; H04J 14/00; H04J 14/08
[52] U.S. Cl. .......... 359/123; 359/137; 359/158; 359/161; 375/371
[58] Field of Search .............. 359/135, 123, 359/137, 158, 140, 162, 180, 183, 189, 194, 161; 375/362, 371, 373, 356, 359–360; 370/100.1; 327/141, 291; 455/208

[56] References Cited

U.S. PATENT DOCUMENTS

| | | | |
|---|---|---|---|
| 4,406,516 | 9/1983 | Hasegawa | 350/96.29 |
| 4,473,901 | 9/1984 | Jensen | 359/135 |
| 4,635,263 | 1/1987 | Mollenauer | 372/3 |
| 4,700,339 | 10/1987 | Gordon et al. | 370/3 |
| 4,791,407 | 12/1988 | Prucaal et al. | 359/158 |
| 4,830,451 | 5/1989 | Stone | 350/96.15 |
| 4,861,136 | 8/1989 | Stone et al. | 350/96.3 |
| 5,035,481 | 7/1991 | Mollenauer | 350/96.16 |
| 5,037,180 | 8/1991 | Stone | 385/123 |
| 5,050,954 | 9/1991 | Gardener et al. | 385/16 |
| 5,117,303 | 5/1992 | Desurvire et al. | 359/341 |
| 5,140,656 | 8/1992 | Hasegawa et al. | 385/24 |
| 5,357,364 | 10/1994 | Gordon et al. | 359/173 |

OTHER PUBLICATIONS

Dianov, E.M., et al., "Long–Range Interaction of Solitons in Ultra–Long Communication Systems," Sov. Lightwave Commun., vol. 1, pp. 235–246, 1991.

Gordon et al., "Effects of Fiber Nonlinearities and Amplifier Spacing on Ultra–Long Distance Transmission," J. Lightwave Tech., vol. 9, No. 2, pp. 170–173, Feb. 1991.

Gordon et al., "Random Walk of Coherently Amplified Solitons in Optical Fiber Transmission," Optics Lett., vol. 11, No. 10, pp. 665–667, Oct. 1986.

Kobrinski et al., "Wavelength–Tunable Optical Filters: Applications and Technologies," IEEE Comm. Mag., pp. 53–63, Oct. 1989.

Kodama et al., "Analysis of Soliton Stability and Interactions with Sliding filters," Opt. Letts., vol. 19, No. 3, pp. 162–164, Feb.1, 1994.

Kodama et al., "Generation of Asymptitocally Stable Optical Solitons and Suppression of the Gordon–Haus Effect," Opt. Letts., vol. 17, No. 1, pp. 31–33, Jan. 1, 1992.

Mecozzi et al., "Soliton Transmission Control," Opt. letts., vol. 16, No. 23, pp. 1841–1843, Dec. 1, 1991.

Mecozzi et al., "Effect of Filters on Soliton Interactions in Wavelength–Division–Multiplexing Systems," Opt. Letts., vol. 17, No. 14, pp.988–990, Jul. 15, 1992.

Miller et al., "Optical Fiber Telecommunications II," Academic Press, pp. 90–99, 1988.

Mollenauer et al., "Wavelength Division Multiplexing with Solitons in Ultra–Long Distance Transmission Using Lumped Amplifiers," J. Lightwave Tech., vol. 9, No. 3, pp. 362–367, Mar. 1991.

(List continued on next page.)

*Primary Examiner*—Kinfe-Michael Negash

[57] ABSTRACT

A clock recovery circuit for following rapid changes in the time phase of a data stream is disclosed. The circuit comprises a low Q resonator coupled to a detection device, such as an electro-optic modulator in a time division demultiplexer or a decision circuit of a receiver. Preferably, a high Q resonator or phase locked oscillator is provided, as well. The present invention is particularly useful in a telecommunications system for transmitting solitons. A method of compensating for changes in time phase of a data stream is also disclosed.

39 Claims, 10 Drawing Sheets

OTHER PUBLICATIONS

Mollenauer et al., "Demonstration of Error-Free Soliton Transmission over more than 15000 km at 5 Gbit/s, Single-channel, and over more than 11000km at 10 Gbit/s in Two-channel WDM," Elec. Letts., vol. 28, No. 8, pp. 792–794, Apr. 9, 1992.

Mollenauer et al., "Demonstration, Using Sliding-Frequency Guiding Filters, of Error-Free Soliton Transmission Over More than 20 Mm at 10 Gbit/s, Single Channel, and Over more than 13 Mm at 20 Gbit/s in a Two-Channel WDM," Elec. Letts., vol. 29, No. 10, pp. 910–911, May 13, 1993.

Mollenauer et al., "Measurement of Timing Jitter in Filter-Guided Soliton Transmission at 10 Gbit/s and Achievement of 375 Gbits/s–Mm, Error Free, at 12.5 and 15 Gbits/s," Opt. Letts., vol. 19, No. 10, pp. 704–706, May 15, 1994.

Mollenauer et al., "Soliton Transmission Speeds Greatly Multiplied by Sliding-Frequency Guiding Filters," Opt. Phot. News, pp. 15–19, Apr. 1994.

Mollenauer et al., "The Sliding-Frequency Guiding Filter: An Improved Form of Soliton Jitter Control," Opt. Letts., vol. 17, No. 22, pp. 1575–1577, Nov. 15, 1992.

Nakazawa et al., "10 Gbit/s Soliton Transmission Over One Million Kilometres," Elec. Letts., vol. 27, No. 14, pp. 1270–1272, Jul. 4, 1991.

Senior et al., "Devices for Wavelength Multiplexing and Demultiplexing," IEEE Proc., vol. 136, Pt.J., No. 3, pp. 183–202, Jun. 1989.

Senior, J.M., *Optical Fiber Communications: Principles and Practice,* pp. 262–270, (Prentice–Hall Int'l (UK) Ltd., 2ed., 1992).

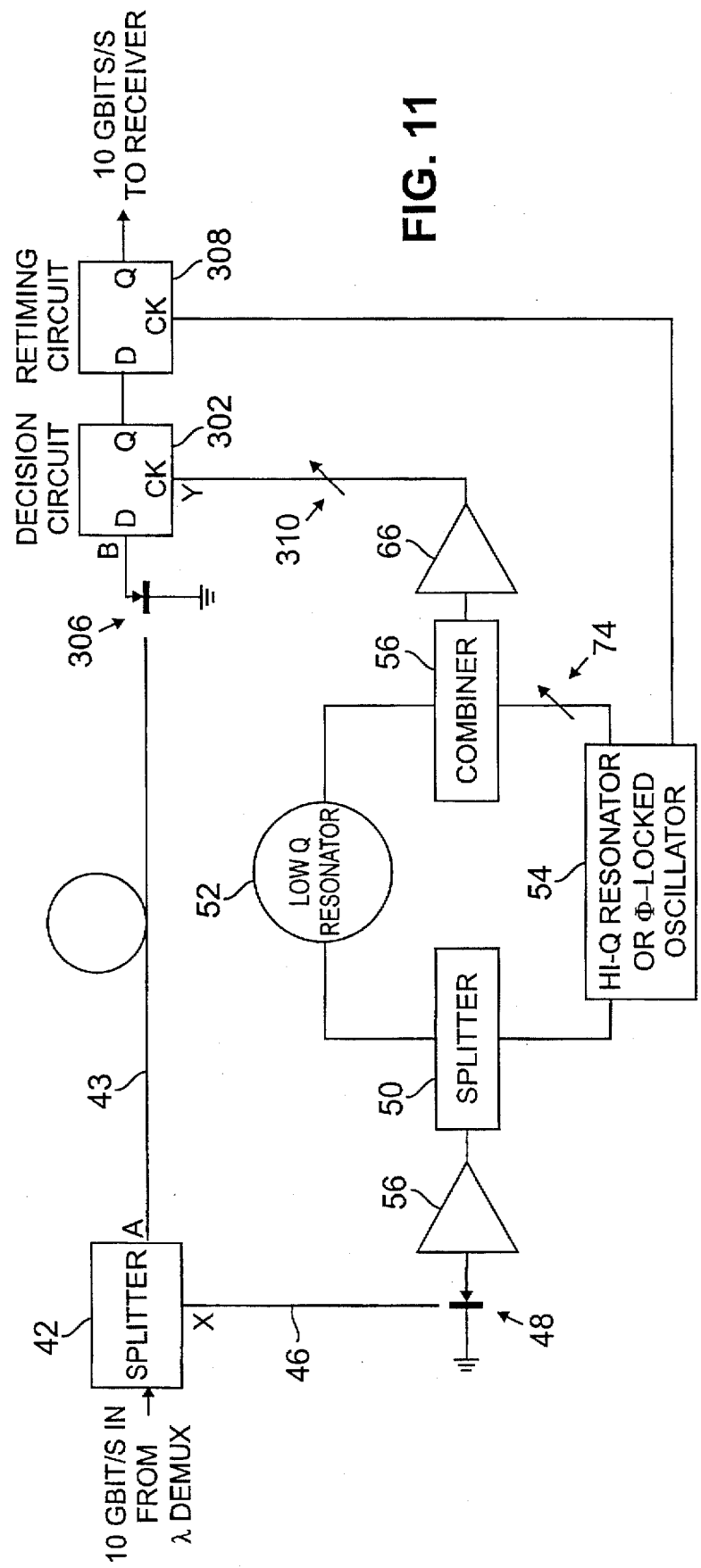

APPARATUS AND METHODS FOR NULLING NON-RANDOM TIMING JITTER IN THE TRANSMISSION OF DIGITAL OPTICAL SIGNALS

FIELD OF THE INVENTION

The present invention relates to apparatus and methods for the transmission of digital optical signals and, more particularly, apparatus and methods for transmission of digital optical signals, such as solitons, which compensate for jitter in single and multi-channel systems.

BACKGROUND OF THE INVENTION

Soliton transmission systems can potentially provide exceedingly high information transmission capacity over long distances. In ultra-long distance systems, such as transcontinental and transoceanic systems, optical amplifiers periodically boost the power of propagating information-bearing soliton pulses to compensate for losses experienced in the fiber transmission medium. The maximum information bit rate for a system employing a single wavelength channel is set by the amount of jitter in pulse arrival times generated by two different effects. One is the Gordon-Haus effect and the other is an acoustic interaction effect.

The Gordon-Haus effect is caused by the interaction of soliton pulses with amplifier spontaneous emission noise present along the transmission medium. J. P. Gordon et al. describe this effect in "Random Walk of Coherently Amplified Solitons in Optical Fiber Transmission," Optic Letters, 11(10), pp. 665–7 (1986). Amplifier spontaneous emission noise randomly alters both the amplitude and carrier or channel frequency of the soliton pulses. The frequency shifts result in a jitter in pulse arrival times. Pulse timing jitter can cause a soliton pulse to shift into the time interval reserved for a neighboring soliton pulse. The result, often known as intersymbol interference, is an error in the received information.

The acoustic interaction effect results from electrostriction caused by the electromagnetic field of the soliton pulse. Such electrostriction creates an acoustic wave which crosses the fiber core, changing the index of refraction of the region of the optical fiber proximate the pulse. After the pulse passes, the index of refraction of that region of the optical fiber returns to its normal state. If the soliton pulses are being transmitted at a sufficiently high rate (1 Gbit/sec or greater), a subsequent soliton pulse may arrive in that region before the effect of the prior pulse has dissipated. This can cause a shift in the frequency peak of that soliton pulse. See, for example, E. M. Dianov, A. V. Luchnikov, A. N. Pilipetskii, and A. M. Prokorov, "Long-range interaction of solitons in ultra-long communication systems," Soviet Lightwave Communications, V(1), pp. 235–246 (1991).

It has been found that the Gordon-Haus effect and the acoustic interaction effect can be reduced by the use of optical filters periodically spaced along the fiber optic transmission line. In the most efficient version, the nominal center frequencies of the filters are different from the center frequencies of adjacent filters. The center frequency of each successive optical filter can be translated up or down in a predetermined pattern such as frequency increasing, frequency decreasing, or a combination of both. Use of such filters, referred to as "sliding frequency guiding filters" and described in U.S. Pat. No. 5,357,364, incorporated by reference herein, creates a transmission environment which is substantially opaque to noise while remaining perfectly transparent to solitons. In this transmission system, soliton pulses are launched at a particular frequency and, as they propagate along the transmission medium, are accelerated toward successively different frequencies determined by the optical filter center frequency for each of the sliding-frequency guiding filters. A nonlinear interaction of the soliton pulse with the optical fiber causes each soliton pulse to generate new frequency components to match the frequency of each filter, causing each soliton pulse to emerge at a substantially different frequency from the launch frequency. The action of the filters reduces deviations caused by the Gordon-Haus and acoustic interaction effects.

Since the generation of new frequency components by the soliton pulse is the result of a nonlinear effect, linear pulses, such as noise, cannot generate the new frequencies required to follow the changing frequencies of the sliding filters. Such pulses, therefore, eventually suffer catastrophic energy loss from the action of the sliding filters as they are left behind in a different frequency band. Stronger filter response characteristics are therefore possible, enabling greater jitter reduction than prior art systems without incurring the usual penalty of exponentially rising noise from the excess amplifier gain required to overcome the additional filter loss. The reduction of the Gordon-Haus and acoustic interaction effects dramatically improves transmission of solitons over transoceanic distances.

To maximize the amount of information which can be transmitted through an optical fiber, wavelength division multiplexing (WDM) is typically used to concurrently transmit optical signals at different wavelengths along the same optical fiber. Solitons in adjacent WDM channels interact as in a lossless fiber, as long as the collision length is two or more times the amplifier spacing. See, for example, L. F. Mollenauer, S. G. Evangelides, and J. P. Gordon, "Wavelength Division Multiplexing with Solitons in Ultra Long Distance Transmission Using Lumped Amplifiers," J. Lightwave Technol. 9, p. 362 (1991). Use of WDM, however, introduces two additional sources of jitter, one due to soliton-soliton collisions, and the other due to polarization mode dispersion (PMD).

Soliton-soliton collisions in WDM systems are caused by solitons of shorter wavelength channels, which have higher velocities than those of longer wavelength channels, overtaking and passing through solitons in the longer wavelength channels. While such collisions do not affect most characteristics of the solitons, such as their shape, energy, frequency spectrum and the like, each soliton-soliton collision results in a significant time displacement of each of the colliding pulses over a broad-band transmission line. Since real data streams are more or less random, some pulses tend to experience more collisions and others experience fewer collisions in the course of traversing the system. The time displacements of the collisions, therefore, can result in considerable timing jitter. For example, in a three channel, 10 Mm long system transmitting at 10 Gbits/second per channel, depending on the particular instantaneous sequences of "ones," indicating the presence of solitons, and "zeros", indicating the absence of solitons, pulses in the middle channel can experience net time displacements as large as about ±40 picoseconds (ps). While the use of frequency guiding filters, and especially sliding frequency guiding filters can cancel some of the collision induced time displacements, it does not overcome all such displacements. See L. F. Mollenauer, J. P. Gordon, and S. G. Evangelides, "The sliding-frequency guiding filter: an improved form of soliton jitter control," Opt. Lett. 17, p. 1575 (1992); A. Mecozzi and H. A. Haus, "Effect of filters on soliton interactions in wavelength-division-multiplexing systems,"

*Opt. Lett.* 17(14), pp. 988–990 (1992). Numerical simulations using real sliding frequency filter response functions of the three channel, 10 Gbits/second transmission system discussed above, yield a net time spread of about 10 ps. When more than three channels are involved, the time spread could increase even further.

Soliton-soliton collisions can also alter the polarization state of the colliding solitons. Such polarization scattering can cause jitter in a WDM system, as well. Since some pulses suffer many collisions while others suffer only a few, there can be considerable spread in polarization states among pulses of a given data stream. The residual birefringence of the fiber spans will tend to turn that spread in polarization states into a corresponding spread in pulse arrival times.

To enable simultaneous transmission of many different data streams, time division multiplexing is typically used, wherein bits of the different data streams are interleaved and transmitted along the same optical fiber.

In single and multi-channel systems, the time phase of the pulses also tends to drift with time due to environmental factors such as temperature. A clock recovery system is typically provided to synchronize the detection of the transmitted signals with the signals themselves. For example, the clock recovery may consist of a microwave oscillator, whose frequency and phase can be locked to the corresponding long term mean values of the incoming data stream. The clock recovery can also be a high Q, passive, microwave resonator whose output reflects the pulse repetition frequency and phase. The Q of the microwave resonator is typically at least about 10,000. The phase locked microwave oscillator tends to behave like a resonator with an even higher Q value. Neither of these devices responds quickly enough to changes in the data stream to adjust for the jitter discussed above.

SUMMARY OF THE INVENTION

It has been found that while jitter from the Gordon-Haus effect is random, the jitter caused by the acoustic effect, soliton-soliton collisions and PMD, is not random. The time displacements of such non-random sources are highly correlated and, in accordance with the present invention, can be nulled by synchronizing the time-acceptance window of a detector with the displacements caused by the non-random, correlated sources.

In accordance with one embodiment of the invention, a clock recovery circuit for use in a telecommunications system is disclosed comprising a signal splitter having an input and a first and second output. The signal splitter splits an electrical signal into first and second electrical signals. A low Q resonator having an output and an input is coupled to the first output of the splitter. A high Q resonator or phase locked oscillator having an output and an input is coupled to the second output of the splitter. A combiner having an output and a first input coupled to the output of the low Q resonator and a second input coupled to the output of the high Q resonator, provides a sinusoidal signal whose phase is correlated to the phase of a signal stream provided to the input of the signal splitter, to synchronize time acceptance windows for a detection device with shifts in arrival times of bits of a signal stream. The time acceptance window for the detection device can be provided by an electro-optic modulator. The detection device can also comprise a decision circuit.

A clock recovery circuit for use in a telecommunications system comprising a detection device for detecting a transmitted signal is also disclosed comprising first means for following rapid changes in phase of a signal and providing an output indicative of those changes, second means for following slow changes in the phase of a signal and providing an output indicative of those changes, and means for combining the outputs of the first and second means and providing an output to synchronize time acceptance windows for the detection device with shifts in arrival times of bits of the signal.

In accordance with another embodiment of the invention, a time division demultiplexer for use in a telecommunications system is disclosed comprising an input and a first signal splitter is coupled to the input. The splitter has first and second outputs and splits an optical signal into first and second optical signals. A detector having an output and an input is coupled to the first output of the splitter. A low Q resonator having an output and an input is coupled to the output of the detector, wherein the output of the low Q resonator is a sinusoidal signal whose phase is correlated to the phase of the signal stream provided to the first splitter. A plurality of electro-optic modulators each having first and second inputs is also provided. The second output of the first splitter is coupled to the second input of each of the modulators. The output of the low Q resonator is coupled to the first input of the each of the modulators to synchronize the time acceptance windows of the modulators with shifts in arrival times of bits of the optical signal at the second input of the modulator.

The time division demultiplexer can further comprise a a high Q resonator or phase locked oscillator and a second signal splitter coupled to the input of the low Q resonater and high Q resonater or phase locked oscillator. The output of the low Q resonator and the high Q resonater or phase locked oscillator are coupled to a combiner. The output of the combiner is a sinusoidal signal which synchronizes the time acceptance windows of the modulators with shifts in the arrival times of bits of the optical signal.

In accordance with another embodiment of the invention, a receiver for use in a telecommunications system is disclosed comprising an input, a first signal splitter, and a detector. A low Q resonator having an output and an input is coupled to the detector. The output of the low Q resonator is a sinusoidal signal whose phase is correlated to the phase of a signal stream provided to the first signal splitter. A decision circuit is coupled to the low Q resonator and to the signal stream such that time acceptance windows of the decision circuit are synchronized with shifts in arrival times of bits of the signal stream at the input of the decision circuit.

The receiver can further comprise a second splitter, a high Q resonator or phase locked oscillator, and a combinet coupled to the low Q resonator and to the high Q resonator. The output of the combiner is a sinusoidal signal whose phase is correlated to the phase of a signal stream provided to the input of the signal splitter. The output of the combiner is coupled to the input of the decision circuit, such that the time acceptance windows of the decision circuit are synchronized with shifts in the arrival times of bits of the signal stream.

A method of compensating for changes in phase of an optical signal in a telecommunications system is also disclosed in accordance with the present invention. The method comprises following rapid changes in phase of a transmitted signal, providing a first signal indicative of those changes, and synchronizing time acceptance windows of the detection device with shifts in arrival times of bits of the transmitted signal based on the first signal. The method of can further comprise following slow changes in the phase of a transmitted signal, providing a second signal indicative of the slow changes, summing the first and second signals, and synchronizing time acceptance windows of the detection device based on the sum of the first and second signals. The synchronizing step can comprise driving a plurality of electro-optic modulators by the sum of the two signals. The synchronzing step can also comprise synchronizing a decision circuit.

The features discussed above, as well as additional features and advantages of the present invention, will become more readily apparent by reference to the following description and accompanying drawings.

BRIEF DESCRIPTION OF THE DRAWINGS

FIGS. 10–11 illustrate portions of another embodiment of the present invention, wherein the jitter tracking circuitry synchronizes a decision circuit which is part of a receiver.

DETAILED DESCRIPTION OF THE INVENTION

Figure 1:
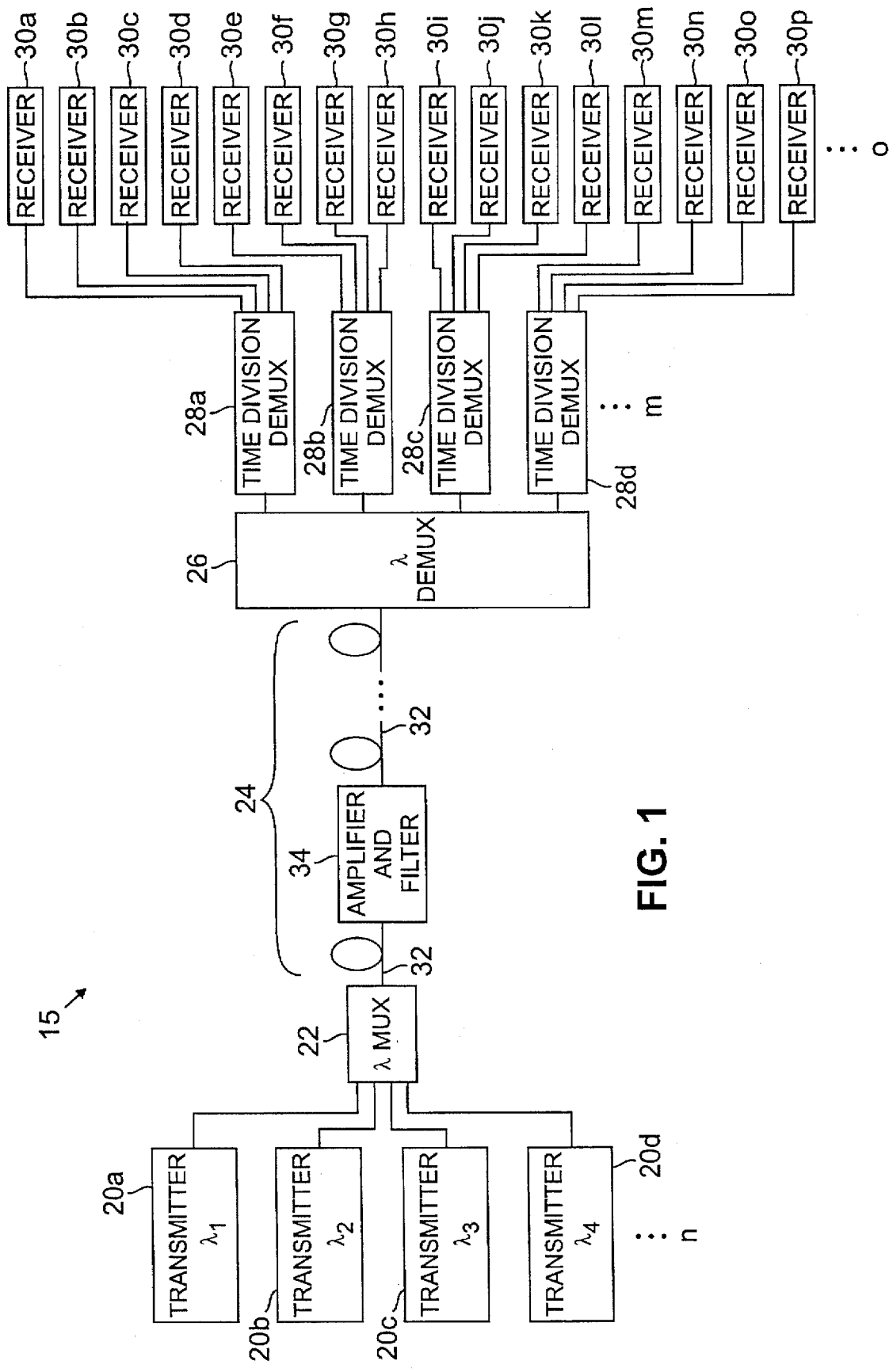
FIG. 1 is a schematic representation of a multi-channel WDM soliton transmission system incorporating the teachings of the present invention.

FIG. 1 is a schematic representation of a multi-channel WDM soliton transmission system 15 incorporating the teachings of the present invention. A multi-channel WDM system can comprise two or more wavelength channels. Four are shown in FIG. 1. The present invention can also be advantageous in a single channel system. A basic single channel system is discussed in detail in U.S. Pat. No. 5,357,364 and U.S. Ser. No. 08/297,336, which are incorporated by reference herein.

The multi-channel optical fiber transmission system 15 of FIG. 1 of the present invention comprises a plurality of transmitters 20a–20d, a wavelength division multiplexer 22, a transmission medium 24, a wavelength division demultiplexer 26, a plurality of time division demultiplexers 28a–28d in accordance with the present invention, and a plurality of receivers 30a–30q. Four wavelength channels are shown here as an example. A system comprising additional channels would comprise additional transmitters "n", which would require additional time division demultiplexers "m" and additional receivers "o", as is known in the art.

The transmitters 20a–20d generate data or signal streams comprising soliton pulses of optical radiation at wavelengths of $\lambda_1$–$\lambda_4$, respectively. Creation of soliton pulses is dependent upon proper launch and transmission characteristics such as pulse power, pulse width, center frequency, fiber dispersion and the like. These characteristics are well known to those skilled in the art and will not be discussed further herein. For additional background information concerning soliton generation and soliton transmission, see *Optical Fiber Telecommunications II*, ed. S. E. Miller et al., p. 90 et seq. (Academic Press 1988) and U.S. Pat. No. 4,406,516, incorporated by reference herein. In this embodiment, the data streams are time division multiplexed to enable simultaneous transmission of many different streams of data, as is known in the art. For example, a 10 Gbits/second data stream can comprise four interleaved 2.5 Gbits/second data streams.

The time division multiplexed soliton pulses from the transmitters 20a–20d are coupled into the transmission medium through the wavelength division multiplexer 22. The multiplexer 22 combines the signals of each wavelength $\lambda_1$–$\lambda_4$ from each of the transmitters 20a–20d for transmission through the same optical fiber 32 of the transmission medium 24. Suitable multiplexers 22 are discussed below.

The transmission medium 24 covers a system path length between the transmitters 20a–20d and the receivers 30a–30p. In most systems of interest, such as transoceanic or transcontinental systems, the system path length is at least several thousand kilometers. Such long distance soliton transmission media are generally realized by a plurality of lengths of optical fiber 32 which are desirably single mode optical fibers having the appropriate group velocity dispersion for supporting soliton propagation at the wavelengths $\lambda_1$–$\lambda_4$ and at those frequencies caused by the action of the preferred sliding frequency guiding filters which are preferred for use in the transmission of solitons. A path average dispersion D of 0.5 picoseconds per nanometer per kilometer is appropriate, for example. Silica-based optical fibers are suitable for this application. Fibers employing different materials as well as different properties such as polarization preservation, may also be used.

Pairs of connected optical amplifiers and filters 34 are preferably disposed at predetermined intervals along the transmission medium 32. The optical amplifiers may suitably comprise an optically pumped section of rare earth doped optical fiber, such as erbium doped optical fiber, to provide gain to pulses propagating at the soliton center frequency. The filters are preferably sliding frequency filters whose nominal center frequencies differ from each other, as described in U.S. Pat. No. 5,357,364 and U.S. Ser. No. 08/297,336, incorporated by references herein. The frequencies of the filters can increase, decrease or both, with distance. It is preferred that the frequencies of the filters increase in the direction of transmission.

While providing pairs of amplifiers and filters 34 is preferred, several amplifiers can be provided in series followed by a single filter. The filters are preferably spaced along the lengths of optical fibers 32, about 30–50 km apart. The amplifier spacings can be similar.

The sliding frequency filters preferably have a parabolic shaped filter response near the peak of its nominal center frequency. Suitable filters may be realized from Fabry-Perot etalons, grating-in-fiber filters and the like. Aside from a parabolically shaped response peak, etalons exhibit many desirable characteristics such as tunability, and a periodic comb characteristic which, in the latter instance, lends to their attractiveness for wavelength division multiplexing applications.

The strength of a parabolically shaped peak filter response is a function of the curvature of the peak. The greater the curvature, the greater the strength. The curvature per unit soliton length of a parabolically shaped filter response around the peak of its nominal center frequency is referred to as the filter strength $\eta$, where all quantities are in soliton units. Fiber Fabry-Perot etalon filters are disclosed in U.S. Pat. No. 4,861,136, U.S. Pat. No. 4,830,451 and U.S. Pat. No. 5,037,180, which are incorporated by reference herein. A multiport optical filter utilizing a Fabry-Perot etalon for wavelength selectivity is described in U.S. Pat. No. 5,050,954. While filters may not have a response curve which lends itself easily to defining a center frequency because of a lack of 3 dB points on the curve, the nominal center frequency of a filter is understood to be the frequency lying between the 3 dB points on a frequency response curve raised to an arbitrary power greater than unity which allows such 3 dB points to appear.

Other exemplary wavelength-tunable optical filters are described by H. Kobrinskie et al. in *IEEE Communications Magazine*, pp. 53–63 (October 1989), also incorporated by reference herein.

As disclosed in U.S. Pat. No. 5,357,364, the mean rate of change of nominal center frequency detuning of the filters as a function of distance is preferably less than a prescribed maximum in soliton units. If the maximum rate is exceeded, the soliton frequency can no longer follow the filters, leading eventually to the elimination of the soliton pulses. For a parabolically shaped filter peak response, the exemplary maximum mean rate was shown to be approximately $(2/27)^{1/2}\eta$.

For a given optical transmission system, there are maximum and minimum soliton energies which can be effectively transmitted. Achieving a sufficiently wide range of maximum to minimum soliton energy is crucial to creation of optical transmission systems with reasonable tolerances for transmission energies. As described in U.S. Ser. No. 08/297,336, a filter strength $\eta$ of about 0.3–0.5 in soliton units provides a ratio of maximum to minimum soliton energy of greater than about 1.5 to 1. The sliding frequency filters 34 in FIG. 1 have a filter strength $\eta$ of about 0.3–0.5 and preferably about 0.4, in soliton units. Preferably, the minimum mean rate of change of nominal center frequency detuning as a function of distance, referred to as the minimum sliding frequency rate $\omega'_{f}$, is approximately equal to $0.034\eta+0.047\eta^2$ in soliton units.

After transmission through the medium 24, the pulses are wavelength division demultiplexed by the demultiplexer 26, which separates the transmitted signal into separate wavelength channels. Wavelength division multiplexing and demultiplexing devices are disclosed in Senior and Cusworth, "Devices for wavelength multiplexing and demultiplexing," IEEE Proc. Pt. J., 136(3) pp. 183–202, 1989; and Optical Fiber Communications, Principles and Practices, 2d. Ed. pp. 262–270, (1992), for example, which are incorporated by reference, herein.

Each demultiplexed wavelength channel is coupled to time division demultiplexers 28a–28d, respectively. The time division demultiplexers 28a–28d preferably include clock recovery circuitry in accordance with the present invention, which synchronizes the signal detection with the incoming data stream, as discussed with respect to FIG. 5, below.

As discussed above, in a single channel soliton transmission system, jitter due to the Gordon-Haus effect and acoustic interaction effect can alter the pulse arrival times of the soliton pulses. In a multi-channel system, soliton-soliton collisions and the resulting polarization mode dispersion (PMD) are additional causes of jitter. While jitter from the Gordon-Haus effect is random, it has been found that jitter from acoustic interactions, soliton-soliton collisions and PMD is highly correlated.

The net time displacement of a given pulse caused by collisions with pulses of another channel is proportional to the number of collisions it experiences as it traverses the system. For example, in a transmission system with a N×10 Gbit/second transmission rate, where the adjacent channel spacing and path-average fiber dispersion are 0.6 nm and 0.5 ps/nm-km, respectively, the minimum spacing between collisions for adjacent channels is 333 km. The maximum possible number of collisions in 10 Mm, therefore, is 30.

Figure 2:
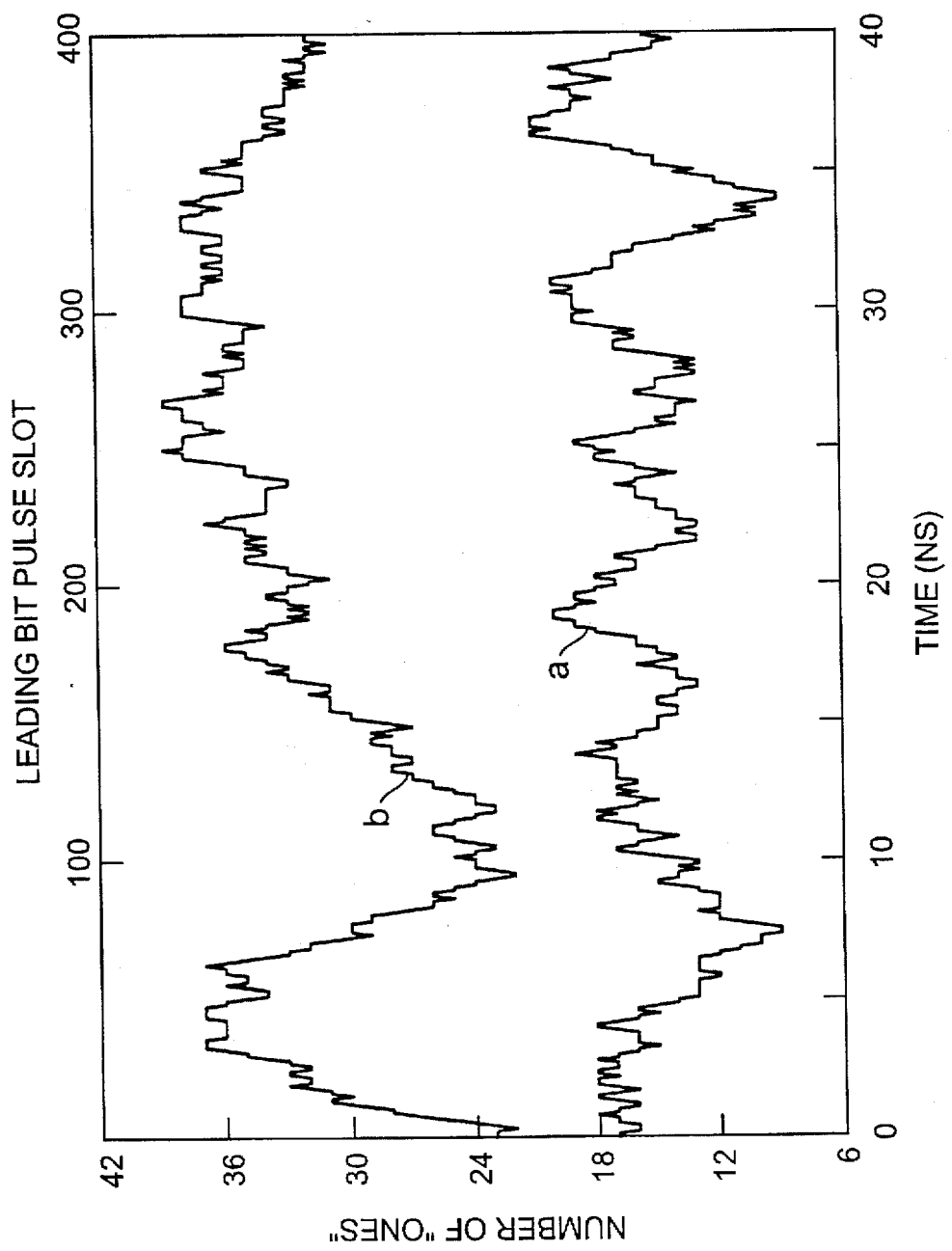
FIG. 2 is a graph of the number of "ones" in each adjacent group of m pulse slots in segments of a random signal pattern, versus the leading bit pulse slot on the top of the graph, and time on the bottom.

FIG. 2 is a graph of the number of "ones" in each adjacent group of m pulse slots in segments of a random pattern, versus the leading bit pulse slot on the top of the graph, and time on the bottom. The number of "ones" corresponds to the number of collisions, and hence the relative time shifts, caused by a neighboring channel. The number of "ones", therefore, is also indicative of the potential timing jitter which needs to be overcome. The time scale corresponds to a bit rate of 10 Gbits/second. In curve a, m=30 and in curve b, m=60. In curve b, since the channels are twice as far apart in terms of wavelength, there are twice as many collisions. The collision-induced, pulse-to-pulse time displacements of adjacent pulses in a data stream have similar behavior with time because the adjacent pulse can have, at most, one more or less collision than the first pulse.

Figure 3A:
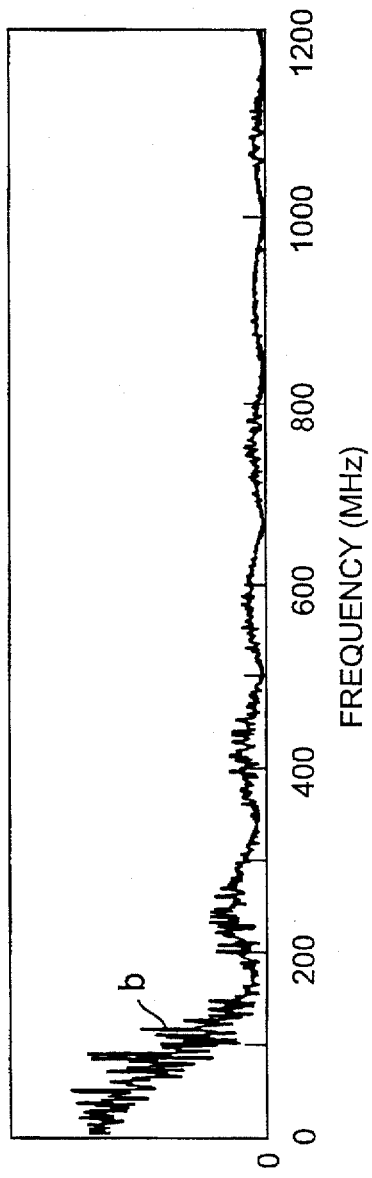
FIGS. 3A and 3B show corresponding frequency spectra (the Fourier transforms) of the distributions of FIG. 2.
Figure 3B:
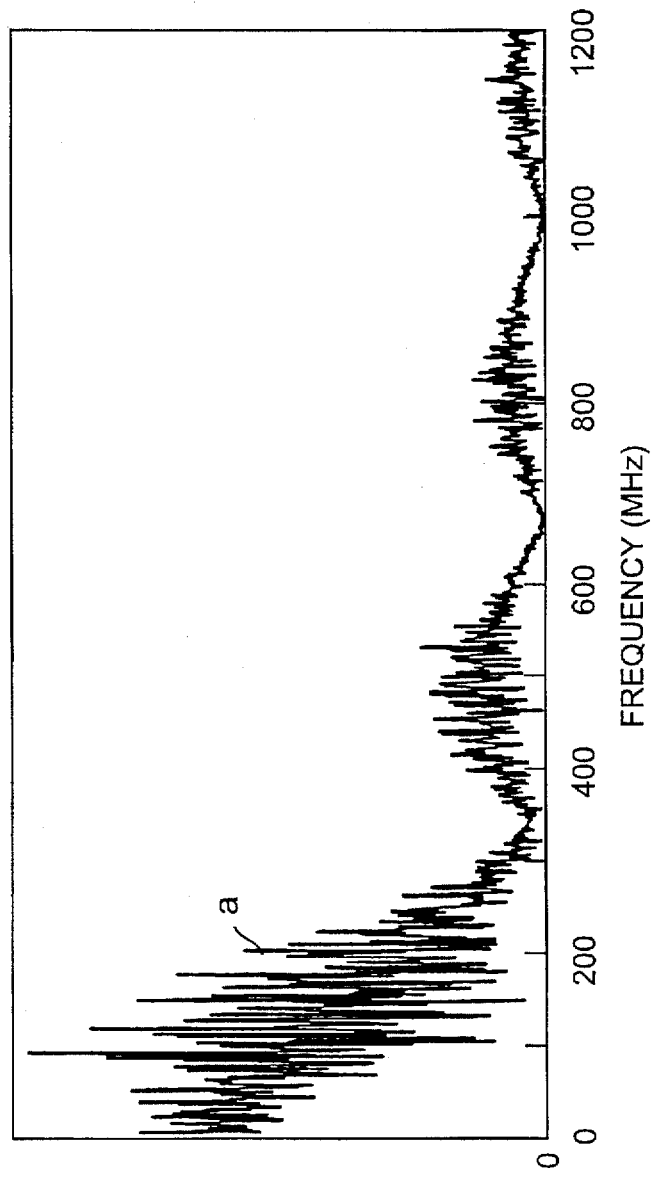

Because of this near continuity of number of collisions experienced by adjacent pulses, the larger excursions of "ones", and hence collisions, tend to take place over a span of at least several nanoseconds. FIG. 3 shows corresponding frequency spectra (the Fourier transforms) of the distributions of FIG. 2. These spectra are concentrated at low frequencies, i.e., at frequencies less than 200–300 Megahertz (MHz) or less. While the curves of FIG. 2 are small segments of 8192 ($2^{13}$) unit sequences, the curves of FIGS. 3A and 3B represent spectra of the entire sequence. To reflect the way time shifts from individual collisions vary with channel spacing, the vertical scale of curve b has been multiplied by a factor of $\frac{1}{4}$. The nulls at 333 MHz and integral multiples thereof in curve a reflect the fact that the correlation length in the time domain is just 30 bit slots (333 MHz=10 GHz/30). Curve b shows a similar effect.

A comparison of curves a and b in FIG. 2, where the time scale for the large fluctuations in curve b is twice that observed in curve a, and in FIGS. 3A and 3B, where the related frequency scale of curve b is just half that of curve a, indicates that the maximum number of collisions, and hence the characteristic time scales for more widely spaced channels, will be in direct proportion to the channel spacing. Thus, as more channels are added to a WDM system, the net spectral density will increase primarily at lower frequencies and the high end of the spectrum will tend to remain as defined by the closest channel spacing. It is this characteristic behavior which makes possible the jitter-tracking scheme to be described here.

Since the spread in pulse arrival times due to changes in the polarization states also monotonically increases with the number of collisions experienced by the pulse, the polarization scattering from collisions also causes only small changes from one pulse to the next. Thus, the characteristic time periods and characteristic spectral features are similar to those discussed with respect to FIGS. 2, 3A and 3B. The net time displacements from the sum of the two collisional effects, the direct time displacements from the collisions and those from polarization scattering, also have the same characteristic time and frequency behavior.

Figure 4:
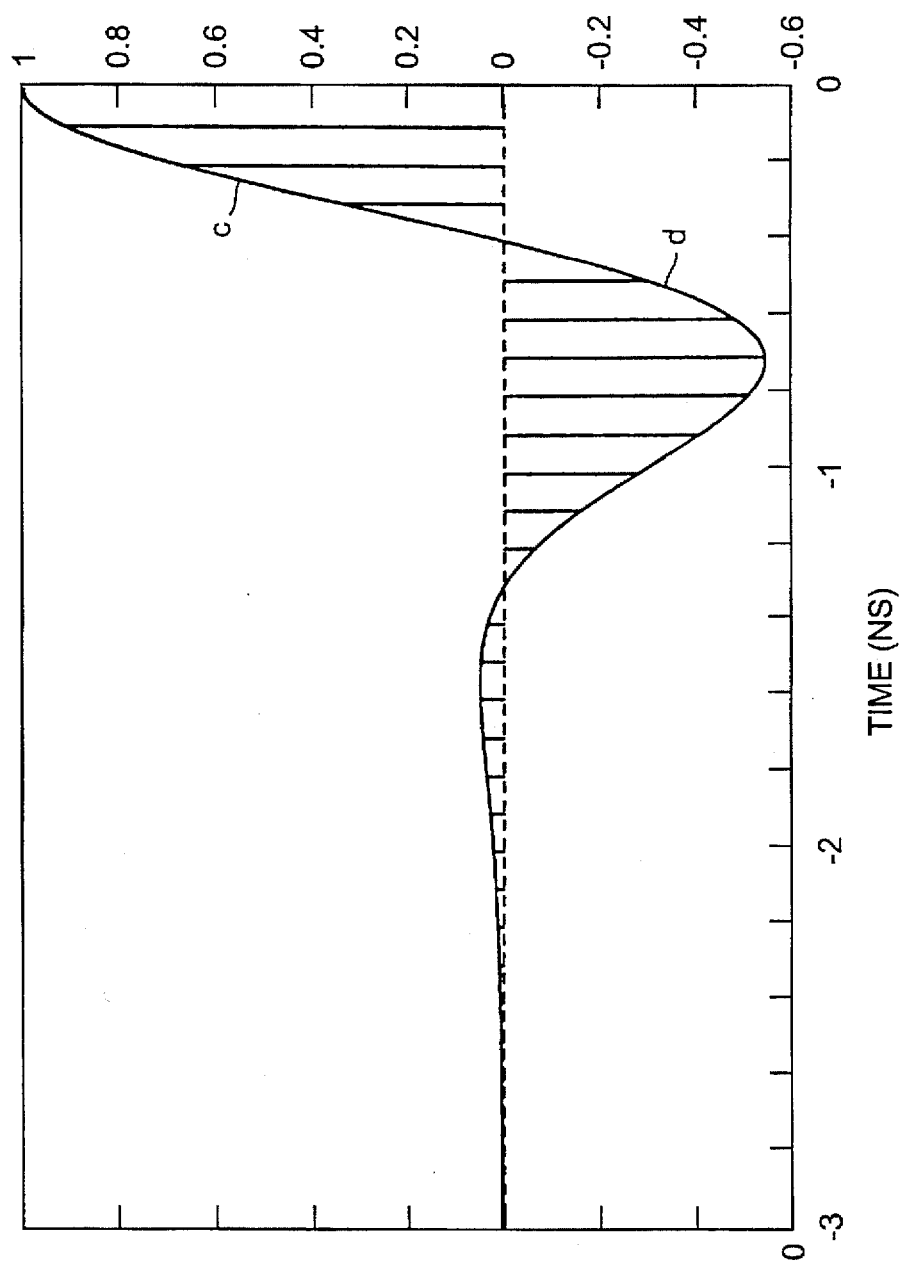
FIG. 4 is a graph of the relative influence from the acoustic effect of preceding solitons on a soliton at t=0.

The force on the soliton which causes time displacements due to acoustic interactions is proportional to the rate of change of the index of refraction caused by the preceding soliton. The effect of acoustic interactions depends primarily on the bit pattern of the pulses, whether of its own channel or of adjacent channels, which precede the affected soliton by up to about 1.2 ns. See, for example, E. R. Dianov et al., "Long-range intersection of solitons in ultra-long communication systems", Soviet Lightwave Communications, p. 1 (1991). At 10 Gbits/second, the greatest accelerations, and hence the greatest time displacements, come from pulses in approximately the first dozen bit slots of its own proper channel immediately preceding the affected soliton. FIG. 4 is a graph of the relative influence of preceding solitons on a soliton at t=0. The vertical bars are located at potential pulse positions at 10 Gbits/second. The extremes of the effect require the large positive peak "c" immediately preceding the soliton to be full of pulses while the large negative peak "d" is empty of them, and vice versa. The minimum time to make the transition between those extremes is just slightly more than 1 ns. Since that pattern can only change in small steps from pulse to pulse, the jitter caused by acoustic interaction is also highly correlated.

Because the time displacements from such non-random sources are highly correlated from one pulse to the next, the time scale for the larger deviations from these non-random sources is typically several nanoseconds or more. It is many times the bit period at the bit rates ($\geq$10 Gbits/second) of interest. Thus, the error-producing potential of such non-random displacements can be compensated for by moving the time acceptance window of a time division demultiplexer in synchronism with the displacements, in accordance with the present invention. While the absolute jitter remains, it will be insignificant on the several times larger time scale of the sub-channels to which the pulses are transferred.

While the characteristic time scale for the acoustic interaction is several times faster than that for the collision effects, the device described here is fast enough to provide significant nulling for this effect, as well. The effect of acoustic interactions with solitons of different channels will tend to be reduced by the relative motion of the interacting channels.

Figure 5:
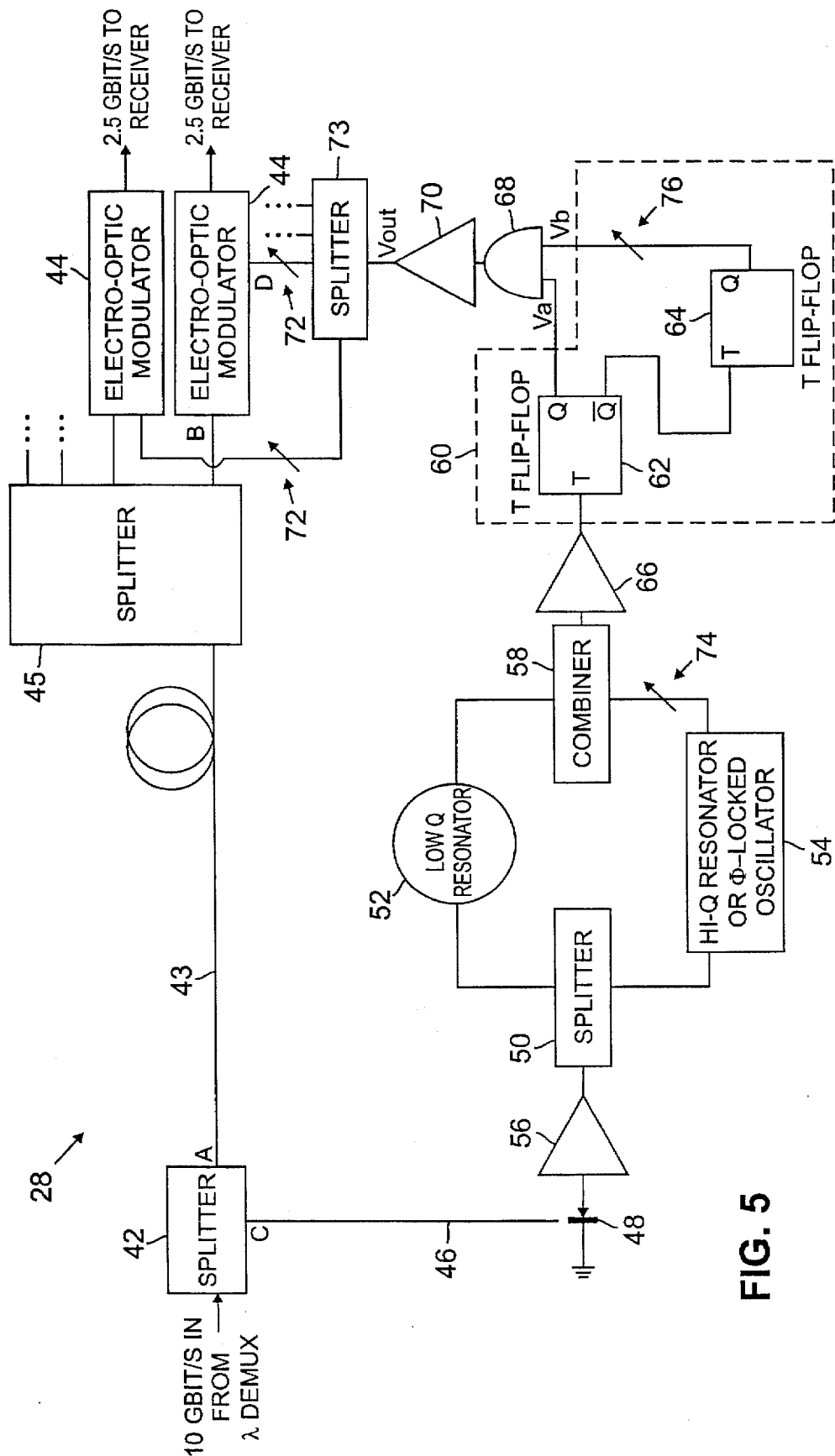
FIG. 5 is a schematic of the time division demultiplexer 28 including jitter tracking circuitry in accordance with one embodiment of the present invention.

FIG. 5 is a schematic of the time division demultiplexer 28 including jitter tracking circuitry in accordance with one embodiment of the present invention. The time division demultiplexer 28 comprises a plurality of electro-optic modulators 44 driven by a locally recovered clock which is capable of following the timing fluctuations due to jitter of the incoming data stream. In this embodiment, the demultiplexer 28 divides a 10 Gbits/second input signal into a 2.5 Gbits/second output signal. Those input and output rates are SONET industry standards. The device could be applied to other rates as well.

Wavelength demultiplexed signals output from the wavelength demultiplexer 26 are provided along separate channels to the time division demultiplexers 28a–28d. The time division demultiplexer in accordance with the embodiment of FIG. 5 comprises a 3 dB optical splitter 42 which divides the wavelength demultiplexed signal into a signal branch AB and a clock-recovery branch CD. The signal branch AB comprises optical fibers 43 connected to one input of the electro-optic modulator 44 through a 3 dB optical splitter 45.

While only two modulators 44 are shown here, there are as many modulators as there are time division channels, in this example four, as is known in the art. The splitter 45 splits the optical signal into as many identical, separate signals as there are modulators 44.

The clock-recovery branch CD comprises optical fiber 46 coupled to a diode detector 48, which converts the optical signals into electrical pulses. The output of the detector 48 is provided to an electrical, microwave splitter 50, which directs the electrical pulses to a low Q resonator 52 and a high Q resonator or phase locked oscillator 54. Preferably, a microwave amplifier 56 whose gain is essentially flat over a band ±1 GHz wide, centered at 10 GHz, is provided between the detector 48 and the splitter 50. The output of the resonators 52, 54 is combined by a combiner 58 and provided to time division circuitry 60. The division circuitry in this example comprises two T flip-flops 62 and 64. Preferably, a high gain amplifier 66 with a gain of 40 dB or greater is provided at the output of the combiner 58. The Q output of each of the two flip-flops 62, 64 is provided to an AND gate 68. The output of the AND gate 68 is provided to a second input of the electro-optic modulator 44, preferably through a broad band microwave amplifier 70 and an adjustable delay 72. An adjustable delay 74 is also preferably provided between the high Q resonator or phase locked oscillator 54, and the combiner 56 so that the output of the low Q resonator 52 and the high Q resonator or phase locked oscillator 54 combine in phase. Another adjustable delay 76 is preferably provided between the Q output of the T flip-flop 64 and the AND gate 68 as discussed further, below.

Optical splitters, electrical splitters, combiners, diodes, adjustable delays, amplifiers, and electro-optic modulators are readibly available conventional devices.

The time division circuitry 60 divides the rate of the incoming signal, here 10 Gbits/second, into the rate of its constituent data streams, here 2.5 Gbits/second. In this example, therefore, the division circuitry is divide-by-four circuitry. Corresponding division circuitry for other rates or additional channels can be provided by further cascading of appropriate flip-flops, as is known in the art.

The low Q resonator 52 is tuned to $f_o$, the fundamental bit rate, here 10 Gbits/second. This resonator converts the input data stream, which is in return-to-zero format, into a sinusoid whose phase is approximately the average phase of the last several pulses to enter it. The output voltage of the resonator 52 decays as: $V(t)=V_o \sin(2\pi f_o t+\phi_o)\exp(-\pi f_o t/Q)$. The low Q resonator 52 responds to modest phase changes in the input signal much as it does to voltage changes. Thus, it acts as a simple low-pass RC filter, with the time constant $\gamma=Q/(\pi f_o)$ of the equation, above. The corresponding 3 dB roll-off frequency is $f_r=f_o/(2Q)$. For a preferred Q factor of about 12.5 in the four time division multiplexed channel system with a bit rate of 10 Gbits/second of this example, $f_r=400$ MHz. The larger spectral components of the timing fluctuations (the phase changes) of FIGS. 2 and 3 are, therefore, reproduced with nearly full amplitude.

Preferably, $Q=n\pi f_o T=n\pi$, where n is the number of bits over which it is desired to average, T is the bit period, $f_o$ is the bit rate and $f_o T=1$. Preferably, the resonator averages over about as many pulses as there are time division subchannels. For example, in this embodiment, where there are four channels, n=4 and a Q factor of about 12.5 provides an average primarily over those pulses occupying the last four bit periods. As the Q of the resonator 52 is increased, the resonator 52 will average over more pulses, decreasing its ability to follow fast changes. As its Q decreases, the resonator 52 will average over fewer pulses.

In order to assure that the outputs of the time division demultiplexers 28 do not skip from one subchannel to another, it is preferred to maintain a continuous clock drive on the T flip-flops 62, 64, even if there are a very long strings of zeros. The high gain microwave amplifier 66 is therefore provided to convert the decaying output of the resonator 52 into an essentially steady sinusoid, for strings of zeros up to about 20 bit-periods long. The output of the amplifier 66 preferably saturates at about 1V peak-to-peak in this embodiment, which is required to drive the T flip-flops 62, 64. In addition, the high-Q resonator 54 with a Q of at least about 10,000 or phase locked oscillator 54, with an even greater effective Q, is preferably provided to generate a sinusoidal signal whose phase is reflective of thousands of pulses, minimizing the effect of longer strings of zeros. The high Q resonator or phase locked oscillator 54 also synchronize the modulator 44 with slow changes in the signal due to environmental factors, as discussed above and is known in the art. Since the low-Q resonator 52 is capable of following such slow changes as well, however, this function is less important.

For the majority of bit sequences, the voltage output from the high Q resonator or phase locked oscillator 54 is low, about 10 mV, for example. This is less than the voltage output of the low-Q resonator 52, which is about 1 volt. Its influence on the net phase is, therefore, small. In the presence of a long string of zeros, however, the output of the low Q resonator 52 can fall below the output of the high Q resonator or phase locked oscillator 54. The output of the high Q resonator or phase locked oscillator 54 then predominates and sustains the clock at the long-term mean phase of the data stream. To smooth this transition, it is preferred to adjust the delay 74 between the two arms of the clock such that the two sources tend to add in phase.

The two T flip-flops 62, 64 and the AND gate 68 are preferably ultra high speed logic chips, as is known in the art. NLG 4108 flip-flops and an NLG 419 AND gate from NEL, NTT Electronics Corporation, Japan, for example, can be used. The time division circuitry 60 and gate 68 convert the output of the combiner 58 and amplifier 66 into 100 picosecond wide square pulses repeated at 2.5 GHz to drive the electro-optic modulators 44 corresponding to the four time division multiplexed signals. As mentioned above, there are four electro-optic modulators 44 in this embodiment. A splitter 73 is therefore provided to split the output of the AND gate 70 into four signals, one to drive each modulator 44. Adjustable delays 72 are provided along each line to provide a delay of about 100 picoseconds between each modulator. Each modulator is therefore enabled in succession every 400 picoseconds to respond to each fourth pulse in the multiplexed data stream.

Shifts in the position of the pulses of the data stream due to jitter cause corresponding shifts in the phase of the sinusoidal output of the low Q resonator 52. The division circuitry 60 and AND gate 70, which respond to the voltage and phase characteristics of the sinusoidal output of the low Q resonator 52 combined with the sinusoidal output of the high Q resonator or phase locked oscillator 54, drive the electro-optic modulator 44 in coordination with the positions of the shifted pulses in time. When a pulse of the data stream arrives at port B of each of the electro-optic modulators 44, the signal at port D of each modulator is essentially indicative of the resonator's response to the position of that pulse at port B, and those immediately surrounding it.

Figure 6:
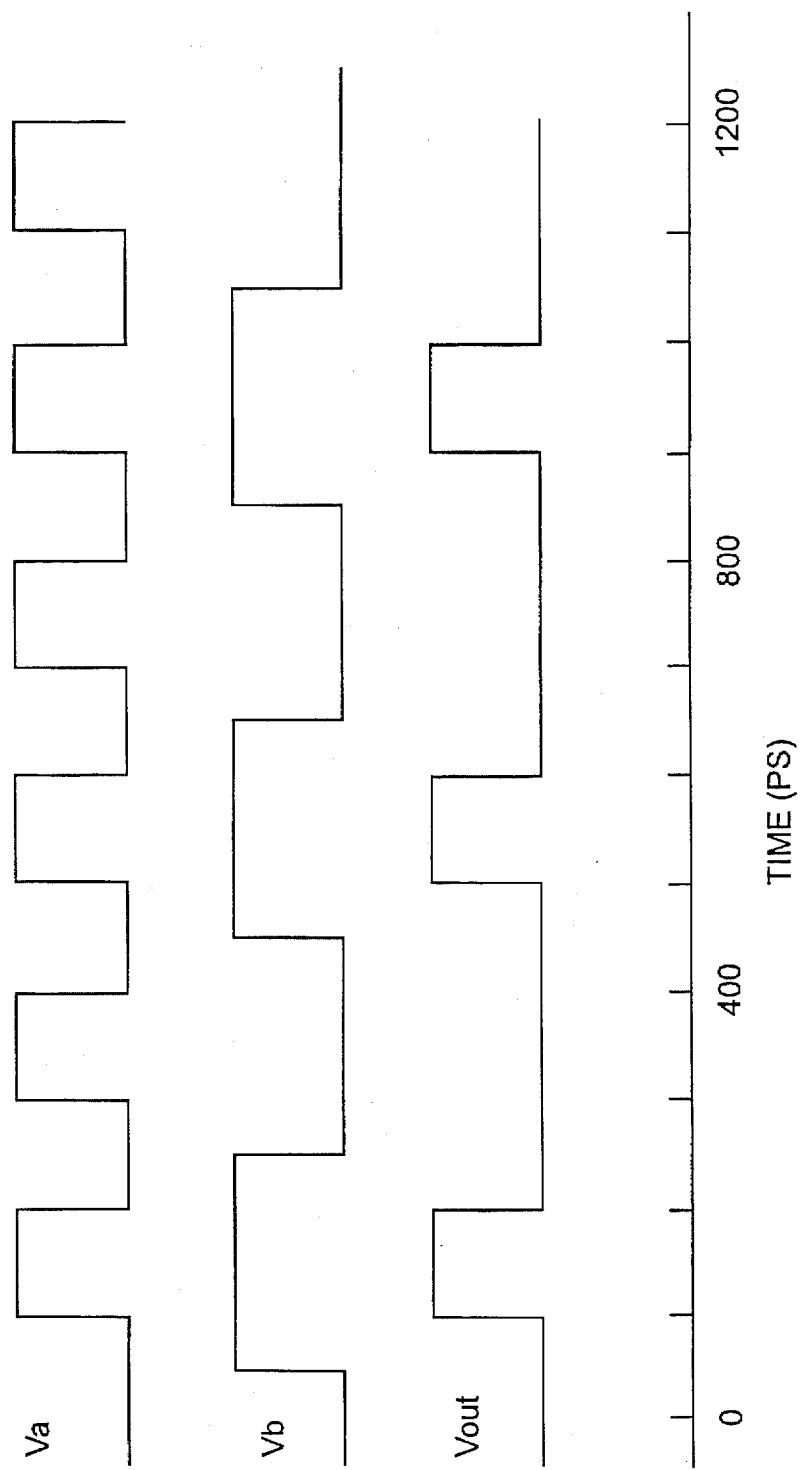
FIG. 6 illustrates the waveforms output by various components of the circuit of FIG. 5.

FIG. 6 illustrates the waveform $V_a$ output by flip-flop 62, the waveform $V_b$ output by the flip-flop 76 and the waveform $V_{out}$ output by the AND gate 68 and amplifier 70. The output of the T flip-flop 62 is a 5 GHz square wave $V_a$ with a width of 100 picoseconds. The output of the T flip-flop is a 2.5 GHz square wave $V_b$ with a width of 200 picoseconds. When $V_a$ and $V_b$ are combined by the AND gate 68, the resultant voltage, $V_{out}$, is a 100 picosecond wide pulse occurring once every 400 picoseconds, which enables the time division multiplexing of the 10 GHz signal into four 2.5 GHz signals in coordination with the pulses themselves. The 100 picoseconds wide pulse $V_{out}$ can never extend beyond the limits set by the 200 picoseconds wide window provided by $V_b$. The paths among the various chips are preferably adjusted such as by proper adjustment of the delay 76, to approximately center each pulse of $V_a$ within a corresponding pulse of $V_b$, as shown in FIG. 6. $V_{out}$ should always remain phase-locked to $V_b$, and hence to one particular 2.5 Gbit/second sub channel.

The constant time delay of the resonator 52 can be exactly compensated for through adjustment of the length of the transmission path CD. Preferably, the length is adjusted to allow the resonator 52 to be stimulated by a group of pulses one decay constant ($\tau$) of the resonator before they are used to enable the modulator 44. In this way, the resonator 52 is able to "look ahead" to acquire required changes in phase before they are actually needed. This feature is especially important for recovery following a long string of zeros.

The resonators 52, 54 can be any of the variety of microwave resonators known in the art. For example, the resonators can be hollow metal cylinders with diameters and lengths which will yield the desired resonance frequency. A metal cylinder with a diameter of about 38 mm and a length of about 57 mm will have a resonance frequency of 10 GHz. The resonator can be rectangular, as well. Dielectric resonators can also be used. Any phase locked oscillator with a high effective Q may be used instead of the high Q resonator, as is known in the art.

Figure 7:
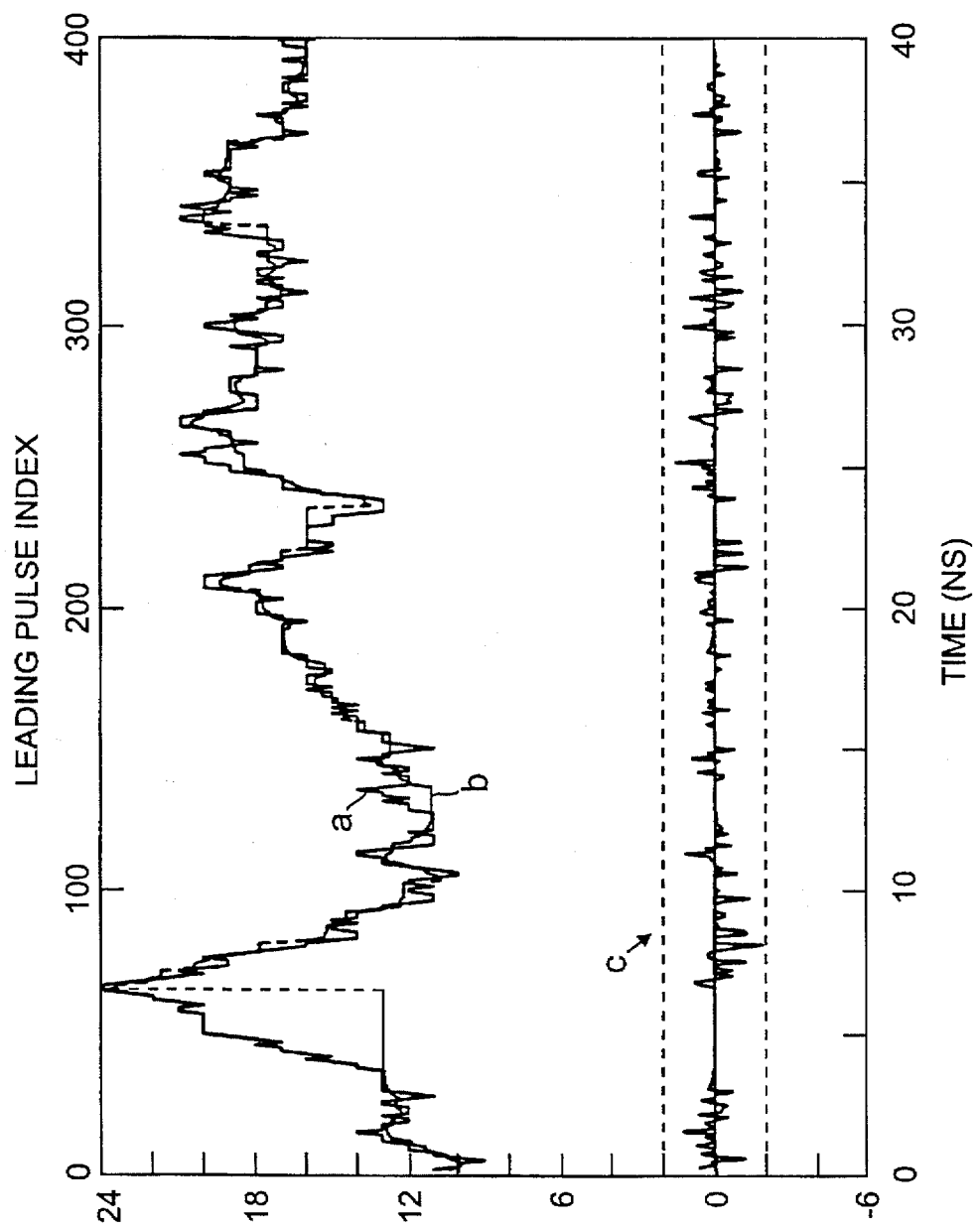
FIGS. 7–8 summarize the results of numerical simulations of operation of the circuit of FIG. 5.

FIG. 7 summarizes the results of a numerical simulation of operation of the device of FIG. 5. The upper curve "a" is another example of a sequence of the sum of "ones" in each successive group of 30 bit slots of a random pattern, similar to that of FIG. 2. The smoother, second curve "b" represents the phase response of the low Q resonator 52 to a primary independent random data stream as initially time shifted according to the first curve a. Thus, the second curve b represents the jitter-tracking time shifts of the acceptance window of the time division demultiplexer. The bottom curve "c" represents the difference between curves a and b, multiplied by the signal bit pattern itself. Multiplication by the bit pattern reflects the fact that a zero, being the absence of a pulse, can have no jitter. The bottom pattern c, therefore, represents the jitter of those pulses actually present in the signal data stream after operation of the jitter tracking circuitry of the present invention. The jitter has been reduced by large factors, here approximately by 4 in maximum peak-to-peak swing, and 7.24 in standard deviation. Since the error rates are exponentially dependent on the standard deviation of the jitter, a potential reduction in bit error rate of many orders of magnitude can be achieved.

The bit pattern for the signal channel in FIG. 7 was purposely altered to produce a 30-bit long string of zeros in the approximate range 3.5<t<6.5 ns, where it could span the first large, steep rise of the raw jitter curve. While the large difference that grows during that interval between the rapidly rising raw jitter and the static filter response could lead to a large spike of uncorrected jitter, the ability of the resonator to "look ahead" by several bit periods enables it to recover the correct phase almost completely before it must act on pulses in those same bit periods.

Figure 8:
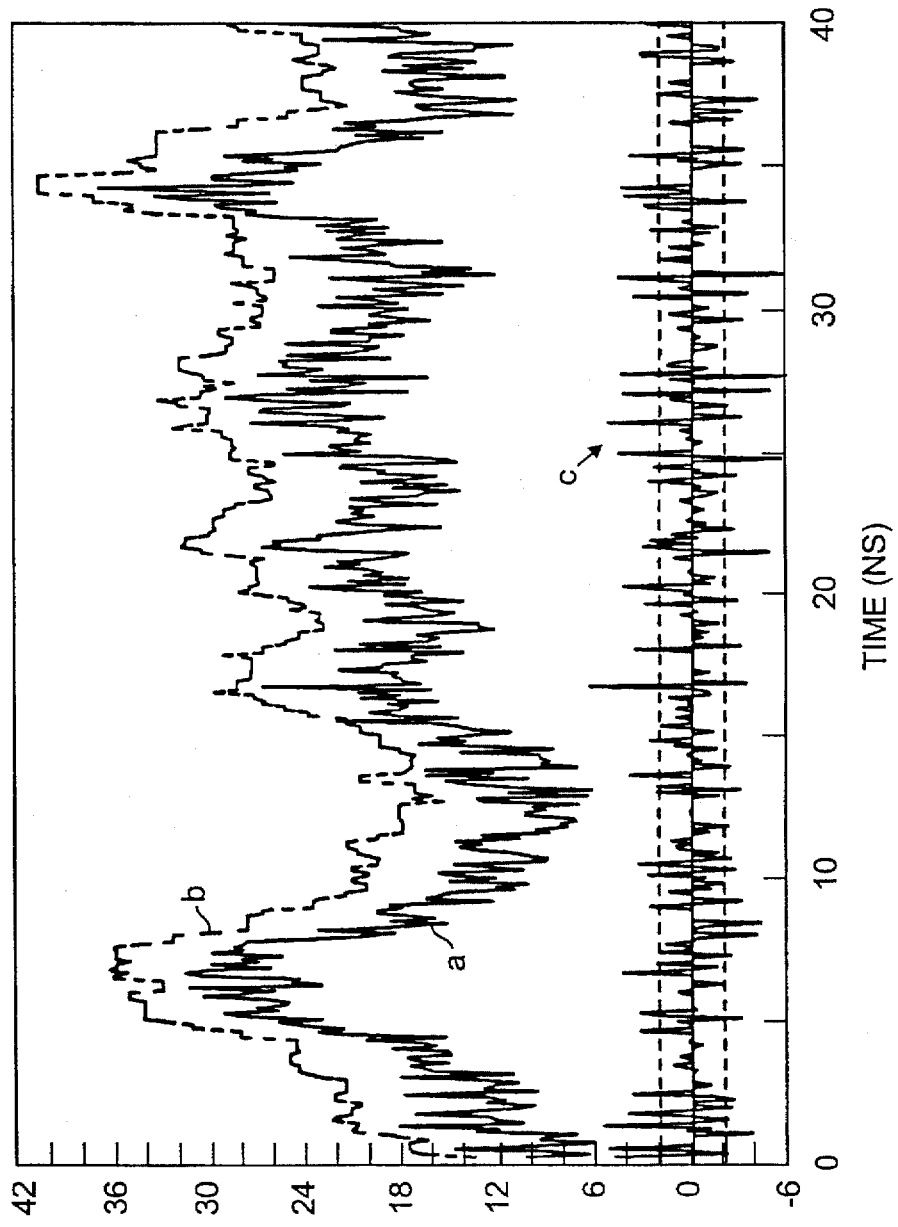

FIG. 8 is another example of a numerical simulation where strictly random Gordon-Haus jitter ($\sigma_{gh}$=2.46 ps) has been added to the collisional effects ($\sigma_{coll}$=5.21 ps) of six channels lying symmetrically about the observed channel. The total jitter $\sigma_{tot}$=5.88 picoseconds. As in FIG. 7, curve "a" corresponds to the bit pattern and curve "b" is the phase response of the resonator 52. Curve b is displaced 8 units upward so that both curves can be clearly observed. The jitter tracking circuitry of the present invention can compensate for all but the most rapid components of the input jitter. As in FIG. 7, the lower curve is the difference between the two curves, multiplied by the bit pattern itself. The standard deviation of the output, $\sigma_{out}$=2.44 picoseconds, is less than that of the input Gordon-Haus jitter alone. This reduction is due in part to the fact that a small portion of the Gordon-Haus jitter lying below about 400 MHz is also corrected by the device. The presence of the Gordon-Haus jitter does not interfere with the device's operation on the slower jitter. The device should, therefore, effect a large reduction in whatever penalty would otherwise stem from non-random jitter in soliton transmission.

Figure 9:
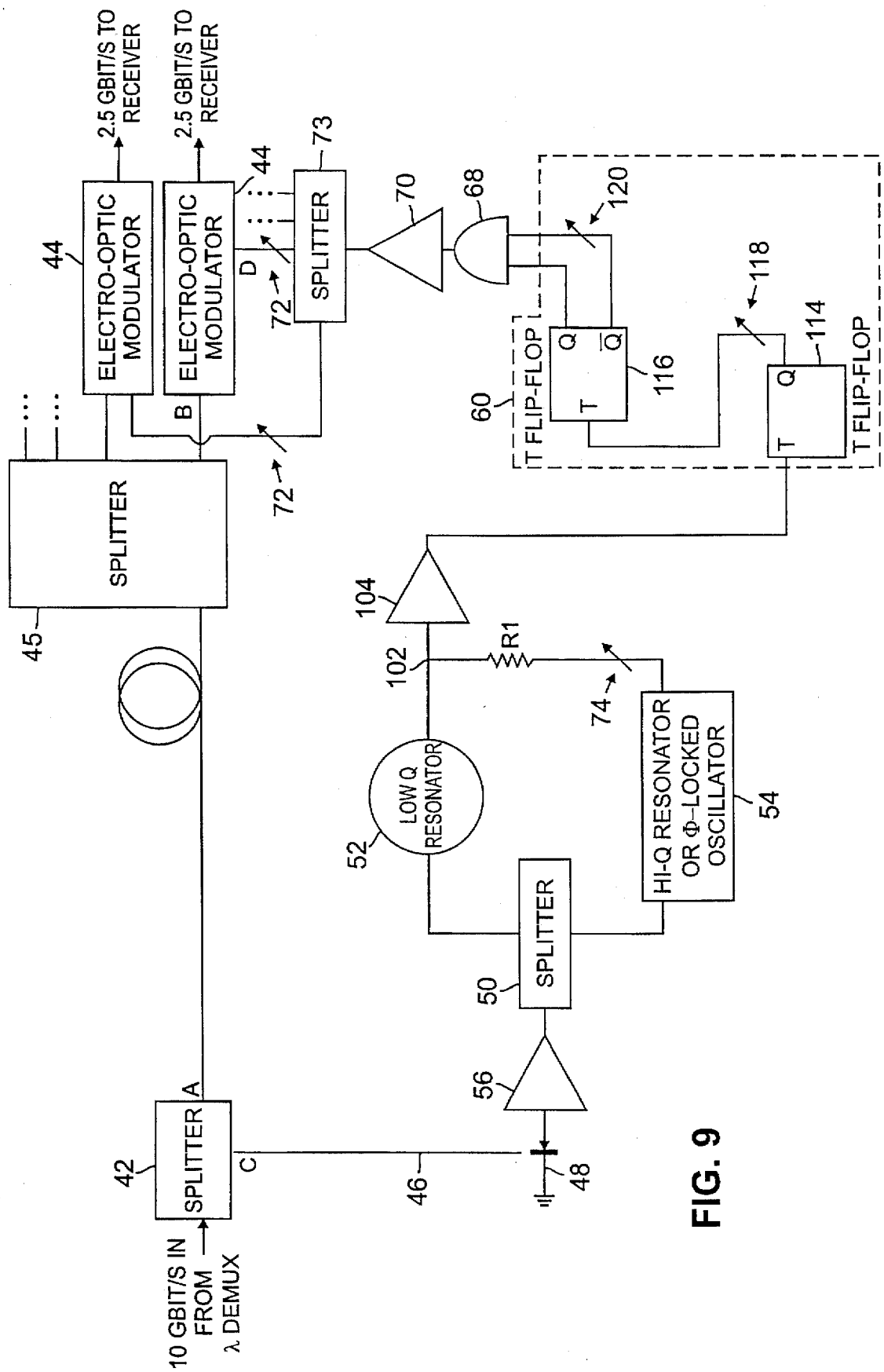
FIG. 9 illustrates an embodiment of the present invention which allows the width of the acceptance window of the modulator 44 to be adjusted.

FIG. 9 illustrates an embodiment of the present invention which allows the width of the acceptance window of the modulator 44 to be adjusted over a considerable range (approximately 0-200 picoseconds). Elements common to the embodiment of FIG. 5 are similarly numbered. The division circuitry 60 in this embodiment preferably comprises a first T flip-flop 114, which receives the output of the amplifier 104 at its T input. The Q output of the T flip-flop 114 is provided to the T input of a second T flip-flop 116, preferably through an adjustable delay 118. The Q and Q̄ outputs of the T second flip-flop 116 are provided to the AND gates 68. An adjustable delay 120 is also preferably provided between either of the outputs Q or Q̄ output of the second flip-flop 116 and the AND gate 68. The remainder of the circuit is the same as in FIG. 5.

The adjustable delay 118 enables alignment of the optical pulses arriving at port B of the modulator 44 with the electrical signals arriving at port D of the modulator, to control of the position of the acceptance window in time. The adjustable delay 120 enables control of the width of the acceptance window by delaying or advancing the signal output by one of the outputs Q or Q̄, with respect to the other.

In addition, instead of directly combining the output of the low Q resonator 52 and high Q resonator or phase locked oscillator 54 in a combiner, as in FIG. 5, the outputs in this embodiment meet at a common node 102. A resistor R1 of 450 ohms is preferably provided between the high Q resonator or phase locked oscillator and node 102. The resistor R1 attenuates the output of the high Q resonator or phase locked oscillator 54 so that the output of the low Q resonator 52 has the greatest effect on the resulting sinusoidal signal, unless there is a long string of zeroes. The output of node 102 is preferably provided to a 40 dB amplifier 104. The output of the amplifier 104 is provided to the division circuitry 60.

FIGS. 10-11 illustrate a portion of another embodiment of the present invention, wherein the jitter tracking circuitry synchronizes a decision circuit 302 which is part of a receiver 304. In this embodiment, the transmitted signals are not time division multiplexed. A time division demultiplexer is not, therefore, provided and signals in each wavelength channel are directly received by a receiver 304 at the transmission rate, here, 10 Gbits/second. The decision circuit 302 determines whether an optical signal is a "1" or a "0", and converts the input signal, which is in return-to-zero format, into a digital signal in non return-to-zero format. The remainder of the system is the same as in FIG. 1.

FIG. 11 shows how the jitter tracking circuitry can control the decision circuit in this embodiment of the invention. Components which are common to the FIG. 5 embodiment are similarly numbered. As in the embodiment of FIG. 5, after wavelength division demultiplexing, a 3 db splitter 42 splits the signal in each wavelength channel into a first, signal branch AB and a second clock recovery branch XY. In the signal branch, a diode 306 detects the signals transmitted through the optical fibers 43. The diode 306 provides its output to the D input of the decision circuit 302. The Q output of the decision circuit 302 is provided to the D input of a retiming circuit 308.

In the clock recovery branch XY, the diode 48 detects the split optical signal and provides an input to a first splitter 56, preferably through the amplifier 66. As above, the outputs of the splitter are provided to a low Q resonator 52 and a high Q resonator or phase locked loop oscillator 54. The output of the low Q resonator and one output of the high Q resonator or phase locked oscillator 54 are combined in the combiner 58 and provided to the CK input of the decision circuit 302, preferably through a high gain amplifier 66. A second output of the high Q resonator or phase locked oscillator 54 is preferably provided to the CK input of the retiming circuit. As in FIG. 5, an adjustable delay 74 is provided between the high Q resonator or phase locked oscillator 54 and the combiner 58. An adjustable delay 310 is preferably provided between the amplifier 66 and decision circuit 302. The characteristics of the high and low Q resonators in FIG. 10 are preferably the same as those of FIG. 5.

Since the signals in the signal branch AD are directly received at 10 Gbits/second, there is no need to divide down the pulse rate in the clock recovery branch.

The decision circuit is preferably an ultra high speed logic circuit, which determines whether the amplitude of the signal detected by the diode 306 exceeds a threshold. If the threshold is exceeded, a "1" is output from the Q output of the circuit 302 when a pulse is received at the CK input of the circuit 302. If the threshold is not exceeded when a pulse is received at the CK input, a "0" is output from the Q output. The output of the decision circuit 302 is thereby synchronized with the shifts in the soliton pulses. The decision circuit 302 can be a D flip-flop with slice amplifier from NEL, for example.

While enabling proper detection of the shifted soliton pulses in time, the output of the decision circuit 302 itself is shifted in time due to the jitter. Because of the rapid rate of the received signal (10 Gbits/second), such jitter can cause significant displacements. A retiming circuit is therefore required in this embodiment to adjust the positions of transitions from 1 to 0 and 0 to 1 in time. The retiming circuit 308 can be driven by the high Q resonator or phase locked oscillator 54, which provides a steady signal. The retiming circuit can also be the D flip-flop with slice amplifier from NEL, for example.

The Q of the low Q resonator in this embodiment preferably enables averaging over at least several bits of the signal stream. A Q of about 12.5 is appropriate. The Q of the high Q resonator or the effective Q of the phase locked oscillator 54 in this embodiment is preferably the same as in the above embodiments.

While the above embodiments of the invention are used to compensate for timing jitter in soliton transmission, it can be used to compensate for timing shifts or jitter in the transmission of any type of digital optical signal.

The various embodiments set forth above are for the purpose of illustration. It will be appreciated by those skilled in the art that various changes and modifications may be made to the embodiments described in this specification without departing from the spirit and scope of the invention as defined by the appended claims.

I claim:

1. A clock recovery circuit for use in a telecommunications system, the circuit comprising:
   a signal splitter having an input and a first and second output, the signal splitter splitting an electrical signal into first and second electrical signals;
   a low Q resonator having an output and an input coupled to the first output of the splitter;
   a high Q resonator or phase locked oscillator having an output and an input coupled to the second output of the splitter;
   a combiner having an output and a first input coupled to the output of the low Q resonator and a second input coupled to the output of the high Q resonator or phase locked oscillator, wherein the output of the combiner is a sinusoidal signal whose phase is correlated to the phase of a signal stream provided to the input of the signal splitter, to synchronize time acceptance windows for a detection device with shifts in arrival times of bits of a signal stream.

2. The clock recovery circuit of claim 1, wherein the time acceptance window for the detection device is provided by an electro-optic modulator.

3. The clock recovery circuit of claim 2, wherein the frequency of the output of the combiner is divided.

4. The clock recovery circuit of claim 3, wherein the output is divided by cascaded flip-flops.

5. The clock recovery circuit of claim 1, further comprising an adjustable delay between the output of the high Q resonator and the input to the combiner.

6. The clock recovery circuit of claim 1, further comprising an adjustable delay between the output of the combiner and an input to a modulator such that the signal output by the combiner may be input to the modulator essentially concurrently with a corresponding bit of the signal stream.

7. The clock recovery circuit of claim 1, wherein the telecommunications system is time division multiplexed and Q of the low Q resonator is approximately equal to $n\pi$, where n is the number of time division multiplexed channels of the system.

8. The clock recovery circuit of claim 1, wherein the detection device comprises a decision circuit.

9. A clock recovery circuit for use in a telecommunications system comprising a detection device for detecting a transmitted signal, the circuit comprising:
   first means for following rapid changes in phase of a signal and providing an output indicative of those changes;
   second means for following slow changes in the phase of a signal and providing an output indicative of those changes; and
   means for combining the outputs of the first and second means and providing an output to synchronize time acceptance windows for the detection device with shifts in arrival times of bits of the signal.

10. A time division demultiplexer for use in a telecommunications system, the demultiplexer comprising:
    an input;
    a first signal splitter coupled to the input of the time division demultiplexer, the splitter having first and second outputs, the splitter splitting an optical signal into first and second optical signals;
    a detector having an output and an input coupled to the first output of the splitter;
    a low Q resonator having an output and an input coupled to the output of the detector, wherein the output of the low Q resonator is a sinusoidal signal whose phase is correlated to the phase of the signal stream provided to the first splitter; and
    a plurality of electro-optic modulators each having first and second inputs, wherein the output of the low Q resonator is coupled to the first input of each of the modulators and the second output of the first splitter is coupled to the second input of each of the modulators, to synchronize the time acceptance windows of the modulators with shifts in arrival times of bits of the optical signal at the second input of the modulators.

11. The time division demultiplexer of claim 10, further comprising:
    a second signal splitter coupled to the output of the detector, the second splitter having an input and first and second outputs, wherein the first output is coupled to the input of the low Q resonator, the second signal splitter splitting an electrical signal output by the detector into first and second electrical signals;
    a high Q resonator or phase locked oscillator having an output and an input coupled to the second output of the splitter; and
    a combiner having a first input coupled to the output of the low Q resonator and a second input coupled to the output of the high Q resonator or phase locked oscillator, wherein the output of the combiner is a sinusoidal signal whose phase is correlated to the phase of a signal stream provided to the input of the first signal splitter, the combiner having an output coupled to the second input of each of the modulators, to synchronize the time acceptance windows of the modulators with shifts in the arrival times of bits of the optical signal.

12. The time division demultiplexer of claim 11, wherein the output of the combiner corresponds to the bit of the optical signal provided to the second input of the modulator.

13. The time division demultiplexer of claim 12, further comprising an adjustable delay between the output of the combiner and the second input of the modulator, wherein the delay can be adjusted such that the output of the combiner corresponds to the bit of the optical signal.

14. The time division demultiplexer of claim 12, further comprising time division circuitry, with an input coupled to an output of the combiner and an output coupled to the modulators.

15. The time division demultiplexer of claim 14, further comprising an adjustable delay between the output of the high Q resonator and the input to the combiner.

16. A receiver for use in a telecommunications system, the receiver comprising:
    an input;
    a first signal splitter coupled to the input of the receiver, the first signal splitter having an input and a first and second output, the splitter splitting an optical signal into first and second optical signals;
    a detector having an output and an input coupled to the first output of the splitter;
    a low Q resonator having an output and an input coupled to the first output of the detector, wherein the output of the low Q resonator is a sinusoidal signal whose phase is correlated to the phase of a signal stream provided to the first signal splitter; and a decision circuit having first and second inputs, wherein the output of the low Q resonator is coupled to the first input of the decision circuit and the output of the first splitter is coupled to the second input of the decision circuit, such that time acceptance windows of the decision circuit are synchronized with shifts in arrival times of bits of the signal stream at the input of the decision circuit.

17. The receiver of claim 16, further comprising:

a second splitter coupled to the output of the detector, the splitter having a first output coupled to the low Q resonator and a second output, the second signal splitter splitting an electrical signal output by the detector into first and second electrical signals;

a high Q resonator or phase locked oscillator having an output and an input coupled to the second output of the second splitter; and a combiner having an output and a first input coupled to the output of the low Q resonator and a second input coupled to the output of the high Q resonator or phase locked oscillator, wherein the output of the combiner is a sinusoidal signal whose phase is correlated to the phase of a signal stream provided to the input of the signal splitter, the output of the combiner being coupled to the second input of the decision circuit, such that the time acceptance windows of the decision circuit are synchronized with shifts in the arrival times of bits of the signal stream.

18. The receiver of claim 17, wherein the decision circuit has an output and the receiver further comprises a retiming circuit coupled to the output of the decision circuit.

19. A telecommunications system comprising:

at least one transmitter transmitting a time division multiplexed optical signal;

a transmission medium comprising an input and an output, the input of the transmission medium being coupled to the transmitter;

at least one time division demultiplexer coupled to the output of the transmission medium, wherein the time division demultiplexer comprises a clock recovery circuit which follows rapid changes in phase of the optical signal; and at least one receiver.

20. The telecommunication system of claim 19, wherein the transmitter transmits solitons.

21. A telecommunications system comprising:

a plurality of transmitters, each transmitter transmitting an optical signal at a different wavelength;

a transmission medium comprising an input and an output;

a wavelength division multiplexer having inputs coupled to the plurality of transmitters and an output coupled to the input of the transmission medium;

a wavelength division demultiplexer having an input and outputs, the input of the demultiplexer being coupled to the output of the transmission medium;

a plurality of time division demultiplexers having inputs and outputs, wherein each of the time division demultiplexers comprises a clock recovery circuit which follows rapid changes in phase of its corresponding optical signal;

a plurality of receivers;

wherein the outputs of the wavelength division demultiplexer are coupled to the inputs of the plurality of time division demultiplexers and the outputs of the time division demultiplexers are coupled to the plurality of receivers.

22. The telecommunications system of claim 21, wherein the time division demultiplexer comprises:

a first signal splitter coupled to the output of the wavelength division demultiplexer, the first splitter having first and second outputs, the splitter splitting an optical signal into first and second optical signals;

a low Q resonator having an output and an input coupled to the first output of the splitter, wherein the output of the low Q resonator is a sinusoidal signal whose phase is correlated to the phase of the signal stream provided to the first signal splitter; and a plurality of electro-optic modulators each having first and second inputs, wherein the output of the low Q resonator is coupled to the first input of each of the modulators and the second output of the first splitter is coupled to the second input of each of the modulators, such that time acceptance windows of the modulators are synchronized with shifts in arrival times of bits of the optical signal at the second input of each of the modulators, the outputs of each modulator being provided to a receiver.

23. The telecommunications system of claim 22, wherein the time division demultiplexer further comprises:

a second signal splitter having an input and a first and second output, the splitter splitting an electrical signal into first and second electrical signals, the input of the low Q resonator being coupled to the first output;

a high Q resonator or phase locked oscillator having an output and an input coupled to the second output of the second splitter;

a combiner having an output and a first input coupled to the output of the low Q resonator and a second input coupled to the high Q resonator or phase locked oscillator, wherein the output of the combiner is a sinusoidal signal whose phase is correlated to the phase of a signal stream provided to the input of the signal splitter, the output of the combiner being coupled to the first input of each of the modulators, such that time acceptance windows of the modulators are synchronized with shifts in arrival times of bits of the optical signal.

24. A telecommunications system comprising:

at least one transmitter;

a transmission medium comprising an output and an input, said at least one transmitter coupled to the input of the transmission medium;

a decision circuit; and at least one receiver coupled to the output of the transmission medium, the receiver comprising a clock recovery circuit which follows rapid changes in phase of an optical signal coupled to the decision circuit.

25. The telecommunications system of claim 24, wherein the transmitter transmits solitons.

26. A telecommunications system comprising:

a plurality of transmitters each producing an optical signal at an output;

a wavelength division multiplexer coupled to the plurality of transmitters;

a transmission medium comprising an output and an input coupled to the wavelength division multiplexer;

a decision circuit;

a wavelength division demultiplexer having inputs and an output, the input of the demultiplexer being coupled to the output of the transmission medium and the output of the demultiplexer being coupled to at least one receiver comprising a clock recovery circuit which follows rapid changes in phase of an optical signal coupled to the decision circuit.

27. The telecommunications system of claim 26, wherein the receiver further comprises:

a first signal splitter having an input coupled to the output of the transmission medium and first and second outputs, the signal splitter splitting an optical signal into first and second optical signals;

a low Q resonator having an input coupled to the first output of the splitter and an output; and a decision circuit having a first and second input and an output, wherein the output of the low Q resonator is coupled to the first input of the decision circuit and the second output of the splitter is coupled to the second input of the decision circuit, such that time acceptance windows of the decision circuit are synchronized with shifts in arrival times of bits of the signal stream at the input of the decision circuit.

28. The telecommunications system of claim 27, wherein the receiver further comprises:

a detector having an output and an input coupled to the first output of the splitter;

a second splitter having an input coupled to the output of the detector and a first and second output, the second splitter splitting an electrical signal output by the detector into first and second electrical signals;

a high Q resonator or phase locked oscillator having an output and an input coupled to the second output of the splitter; and a combiner having an output and a first input coupled to the output of the low Q resonator and a second input coupled to the output of the high Q resonator or phase locked oscillator, wherein the output of the combiner is a sinusoidal signal whose phase is correlated to the phase of a signal stream provided to the input of the signal splitter, the output of the combiner being coupled to the first input of the decision circuit, such that time acceptance windows of the decision circuit are synchronized with shifts in arrival times of bits of the signal.

29. The telecommunications system of claim 28, further comprising a retiming circuit coupled to the output of the decision circuit.

30. A method of compensating for changes in the phase of a transmitted optical signal in a telecommunications system, the method comprising:

following rapid changes in the phase of the transmitted signal;

providing a first signal indicative of those changes; and synchronizing time acceptance windows of a detection device with shifts in arrival times of bits of the transmitted signal based on the first signal.

31. The method of claim 30, wherein the transmitted optical signal comprises solitons.

32. A method of compensating for changes in the phase of a transmitted optical signal in a telecommunications system, the method comprising:

following rapid changes in the phase of the transmitted signal;

providing a first signal indicative of those changes;

synchronizing time acceptance windows of a detection device with shifts in arrival times of bits of the transmitted signal based on the first signal;

following slow changes in the phase of the transmitted signal; providing a second signal indicative of the slow changes;

summing the first and second signals; and synchronizing time acceptance windows of the detection device based on the sum of the first and second signals.

33. The method of claim 32, further comprising:

splitting the transmitted signal into first and second data signals; and separately following the rapid changes in the first signal and the slow changes in the second signal.

34. The method of claim 33, wherein the transmitted signals comprise time division multiplexed constituent signals having transmission rates, the method further comprising dividing the rate of the sum of the first and second signals into the transmission rate of the constituent signals prior to driving the detection device.

35. The method of claim 34, wherein the synchronizing step comprises driving a plurality of electro-optic modulators by the sum of the two signals.

36. The method of claim 35, further comprising first transmitting at least one time division multiplexed signal.

37. The method of claim 36, further comprising generating a plurality of time division multiplexed signals, wavelength multiplexing the signals, transmitting the signals through a medium, wavelength demultiplexing the signals and the time division demultiplexing the signals.

38. The method of claim 36, further comprising generating plurality of optical signals at different wavelengths, wavelength multiplexing the signals, transmitting the signals through a medium, wavelength demultiplexing the signals, and receiving the signals, wherein the step of receiving the optical signals also comprises following, providing and driving steps.

39. The method of claim 38, wherein the driving step comprises driving a decision circuit.

* * * * *